Aug. 16, 1949.   G. T. EVANS   2,479,223
NONMETALLIC SHEATH CABLE CONNECTOR
Filed Oct. 28, 1947
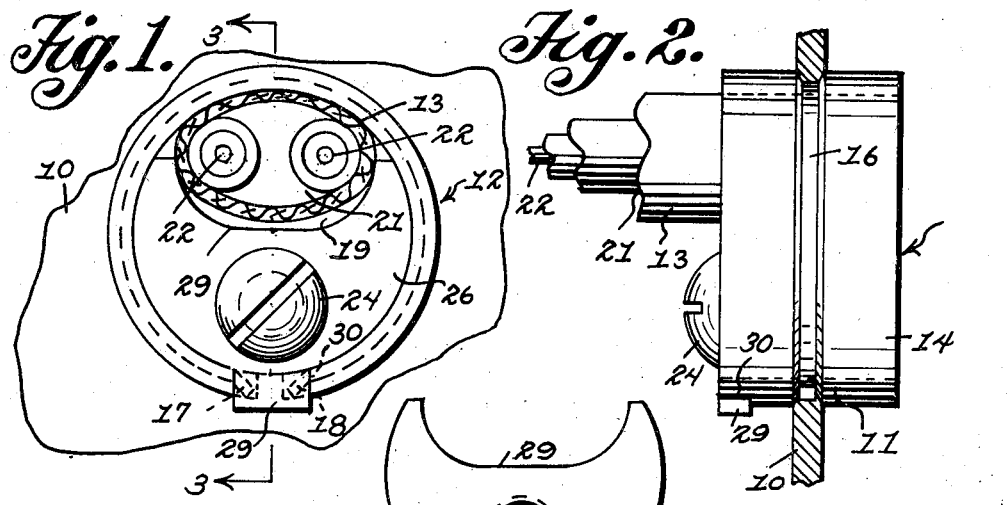
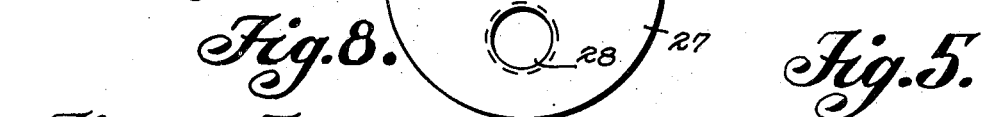
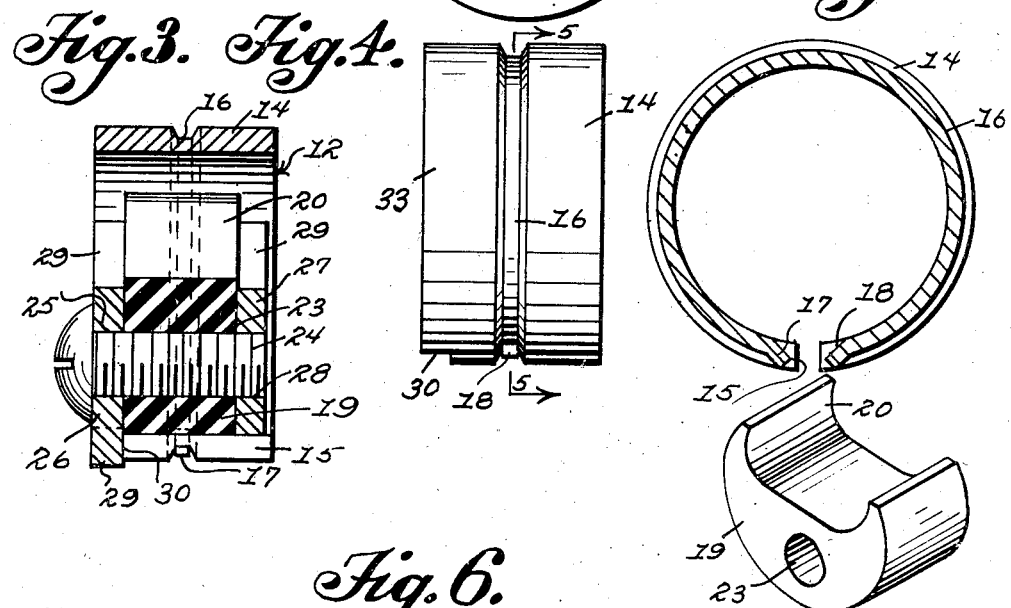
INVENTOR.
Gerald T. Evans
BY Victor J. Evans & Co.
ATTORNEYS Patented Aug. 16, 1949

2,479,223

UNITED STATES PATENT OFFICE 2,479,223

NONMETALLIC SHEATH CABLE CONNECTOR

Gerald T. Evans, Brazil, Ind.

Application October 28, 1947, Serial No. 782,547

2 Claims. (Cl. 285—6.5)

This invention relates to a cable connector for electric non-metallic sheath cables.

It is an object of the present invention to provide a connector suitable for connecting non-metallic sheath cables within outlet openings in switch boxes and the like. The connector is adapted to be fitted into the box by contracting a split sleeve and thereafter securing cable retaining parts within the sleeve.

Other objects of the present invention are to provide a connector for non-metallic sheath cables, which is of simple construction, easy to install on a switch box, inexpensive to manufacture and efficient in operation.

For a better understanding of the invention, reference may be had to the following detailed description taken in connection with the accompanying drawing, in which:

Figure 1 is a fragmentary elevational view of a box with the connector of the present invention fitted therein, and retaining a non-metallic sheath cable therein;

Figure 2 is a side elevational view of the assembly shown in Figure 1;

Figure 3 is a vertical sectional view of the connector and box, taken on line 3—3 of Figure 1, with the cable removed;

Figure 4 is a side elevational view of the split ring and groove for retaining the connector in the box opening;

Figure 5 is a vertical sectional view of the split ring taken on line 5—5 of Figure 4;

Figure 6 is a plan view of one retaining part;

Figure 7 is a perspective view of the internal insulating member and

Figure 8 is a plan view of the other retaining part.

Referring now to the figures, 10 represents a fragment of an outlet on a switch box having an opening 11 therein adapted to receive my connector 12 for retaining and supporting a cable 13 of the non-metallic sheath type within the opening 11.

My connector 12 comprises a spring ring 14 having a transverse split 15, whereby the ring can be compressed in order to permit its movement through the opening 11, so that the annular groove 16, in the circumferential wall of the ring 14 will be adapted to receive the peripheral edge of the opening 11. Opposed ears 17 and 18, respectively, are formed in the ring 14 by cutting the ears from the bottom of the groove 16 at the split 15, as shown in Figure 5. These ears engage the peripheral edge of the opening 11, to prevent rotation of the ring 14 with the opening 11, when the screw 24 is tightened.

Fitted into spring ring 14, is an insulating member 19, Figure 7, having a concave recess 20 in the top thereof for supporting the cable 13. The cable 13 has a non-metallic sheath 21 for two internal wires 22, which are insulated in the conventional manner. The insulating member 19 has an opening 23, through which may be extended a fastening screw 24. This fastening screw 24 extends through an opening 25 in a large plate 26, Figure 6, and is threadably connected with a small plate 27, Figure 8, by means of the tapped opening 28 therein. The plates 26 and 27 are of the same diameter, and will fit within the ring 14. Both plates are provided with a concave recess 29, which is of the same size as the recess 20 in the member 19. The plate 26, however, is provided with a lug 29, which fits within a recess 30 formed at the split 15 of the ring 16. The lug permits better clamping action, and prevents the plates 26 and 27 and member 19 from being pushed through the spring ring 14.

When the screw 24 is tightened, the member 19 is compressed between the plates 26 and 27 to bind the cable within the spring ring 14. This is shown in Figure 1, and more clearly in Figure 3, wherein the member 19 has been compressed so that the recess 20 is of smaller diameter than the recess 29 in the plate. The member 19 will also, under compression, tend to more firmly bind the spring ring 14 within the opening 11.

There has thus been provided a connector for an electric non-metallic sheath cable that will accomplish the objects of the invention, and it is to be understood that various changes may be made in the details of construction, providing that such changes lie within the spirit and scope of the present invention, as defined by the appended claims.

I claim:

1. A connector for non-metallic sheath cables, comprising a spring split ring adapted to fit an opening of a switch box, said ring having means thereon for securing the same within the opening, an insulating member having a top recess for receiving the cable and adapted to be fitted in the ring, and retaining means within the ring on opposite sides of the member for securing and compressing the member against the cable to prevent longitudinal displacement of the cable within the ring, and said retaining means comprising a pair of plates having a recess in the top thereof to receive the cable, a depending lug on one of said plates, a recess in said split ring to receive the lug and a screw extending between the plates and through said member.

2. A connector as defined in claim 1, wherein the means for retaining the ring in the opening in the switch box comprises a circumferential groove formed in the outer surface of the ring, centrally thereof, and opposed ears on said ring depending below the ring at the split therein.

GERALD T. EVANS.

REFERENCES CITED

The following references are of record in the file of this patent:

UNITED STATES PATENTS

| Number | Name | Date |
|---|---|---|
| 1,192,150 | Appleton | July 25, 1916 |
| 1,473,812 | Clements | Nov. 13, 1923 |
| 2,276,969 | Heinichen | Mar. 17, 1942 |